United States Patent Office 3,586,649
Patented June 22, 1971

3,586,649
POLYURETHANE FOAM STRUCTURES WITH INTEGRAL SKIN OF IMPROVED PROPERTIES AND METHOD OF MAKING
David S. Cobbledick, Kent, Ohio, assignor to The General Tire & Rubber Company
No Drawing. Filed Dec. 12, 1968, Ser. No. 783,402
Int. Cl. C08g 22/46, 53/08
U.S. Cl. 260—2.5AZ 8 Claims

ABSTRACT OF THE DISCLOSURE

Non-rigid polyurethane foam structures having an integral skin to which surface coatings may be applied that will not discolor on exposure to ultraviolet light are made from polyurethane foam systems that contain a substituted aryl diamine, e.g., methylene-bis-orthochloroaniline, in combination with a polyol prepared by polymerizing an ethylenically unsaturated monomer in situ in an organic polyol of at least 400 molecular weight, e.g., acrylonitrile polymerized in situ in a polyoxyalkylene ether triol.

BACKGROUND OF THE INVENTION

Field of the invention

Polyurethane plastics and foams have experienced fantastic growth in quantities of such materials that are being used in commerce for an ever-increasing number of purposes. Polyurethanes can be varied in foam and properties from hard, tough plastics to very light weight foams by altering the components of the mixtures used to form the polyurethane. Fundamentally, such products are prepared by reacting a polyisocyanate with compounds having a plurality of groups containing one or more labile hydrogen atoms, such as amine groups, hydroxyl groups, carboxyl groups and the like. The reaction can be accelerated by catalysts which promote the urethane foaming reaction. The active hydrogen containing material is ordinarily a polyol or equivalent polyhydroxy compound or a mixture comprising a major portion of such material. In the case where foams are the desired end a small amount of water and/or an organic pneumatogen, i.e., blowing agent, such as a fluorocarbon, is incorporated into the polyurethane forming mixture. The foam producing compositions also may incorporate a foam stabilizer, and silicone block copolymers are now conventionally used for this purpose.

The present invention is concerned with polyurethane products which are of the foam type. Polyurethane foam broadly may be an opened or closed cell and may be flexible, semi-rigid or rigid. The new improvements described herein concern foams which are opened or closed cells and which are flexible or semi-rigid, i.e., it does not concern the rigid type of foams.

Three basic technics may be employed for the production of polyurethane foams, viz, a complete prepolymer system, a quasi prepolymer system and a one-shot system (cf. U.S. 3,044,971). The new improvements described herein can be applied to any of these different systems of polyurethane foam production.

Polyurethane foams are frequently produced in large sections from which portions of suitable size and shape are cut, e.g., a rectangular pad for the seat of an upholstered sofa or chair. On the other hand, it is possible to cast a foam-forming material in a suitably shaped mold so that the foam structure when finally formed and cured will possess a complex shape which would not have been easily obtainable by cutting from a large block, e.g., crash pads, arm rests, and head rests for automobiles and similar special shaped products. It is frequently advantageous for these shaped foam structures to be provided with a tough outer film or skin to protect the main body of foam and/or to give the foam structure an attractive appearance. A skin of this type on the foam can be created by spraying or otherwise coating the foam products with a suitable film-forming composition. As an alternative, such an outer film or skin has been created on polyurethane foams by covering the interior surface of a shaping mold into which the foam-forming material is cast with a liquid or paste of non-foaming plastic material. Then, when the foam-forming composition is cast in the mold and foamed in contact with the coating on the mold surface, a foam structure is obtained with an integral skin. Another method of forming the foam with a skin is to vacuum form a modified vinyl plastic sheet to the desired shape and then pour in foam forming material. Yet another method is to coat a previously molded foam part with a vinyl resin plastisol coating and then fuse the plastisol onto the foam part.

The present invention is specifically concerned with polyurethane foam structures which possess an integral skin, but which are made by a different procedure and which have certain properties or characteristics not obtainable heretofore in the integral skin foam structures.

Regardless of the method of production of a skin surface on a foam molded part, top finishes or coatings covering the skin are generally necessary for acceptance by the end user. For example, such finishes or coatings provide the matching color for interior trim, give proper gloss, durability and scuff resistance and other characteristics needed for the end use. Obviously, it is highly detrimental for the molded foam part to cause such surface finishes or coating to discolor when the final product is exposed to ultraviolet light, particularly where color matching among separate parts to a vehicle interior must be maintained, since such discoloration becomes immediately apparent.

Description of the prior art

Polyurethane foam structures with an integral skin can be obtained without need to apply a skin-forming composition to the shaping mold before the casting of the foam-forming composition (cf. U.S. 3,099,516). This has been accomplished by adjusting the temperature of the molding surface relative to the foam-forming mixture. In a further modification, there is added to the foam-forming mixture, an aromatic diamine having active hydrogen groups plus other groups which moderate the reaction of the diamine with the other constituents of the foam-producing mixture, especially methoxy and halogen groups, e.g., methylene-bis-orthochloroaniline (cf. French Pat. No. 1,448,751). In such operations, the thickness and other characteristics of the integral skin on the resulting foam structure is to some extent controlled by the temperature of the mold at the time of casting of the mold-forming material so that the integral skin may vary from a very thin covering of little strength to a relatively thick skin separated from the central lightweight foam body by an intermediate dense foam zone.

The method of producing integral skin polyurethane foam structures using aromatic diamines involves certain disadvantages. For one thing, the presence of the aromatic diamines in the foams causes discoloration of any top coats or finishes and a faster yellowing of the foam structure on exposure to ultraviolet light. Secondly, as the density of the foam is lowered by the addition of larger quantities of organic pneumatogen, the integral skin on the foam structure tends to develop pinholes which detract from the appearance of the structure and make it difficult to apply decorative top coatings or finishes.

It is also known in the techniques for producing polyurethane structures to use graft polymers of an ethylenic monomer on a polyol backbone as an active hydrogen material employed in the polyurethane forming reaction to create the final polymer (see U.S. Pat. No. 3,383,351). As an example, such prior development proposes for use as a polyol component of a polyurethane forming composition, a graft polymer prepared by polymerizing an unsaturated material, e.g., styrene or an acrylic ester, on a polypropylene ether diol terminated with hydroxyl radicals. However, such a polyurethane formulation when used to produce foam structures gives products having poor tear strength and low elongations, e.g., tear strengths between 1½ to 2 pounds per inch and elongations of about 70 to 100%.

OBJECTS

The principal object of this invention is the provision of new forms of polyurethane foam structures with integral skins. Further objects include the provision of:

(1) Polyurethane foam products that have good tear strength, good elongation and an integral skin to which surface coatings may be applied, which coatings will not exhibit any substantial discoloration on exposure to ultraviolet light.

(2) Such foam structures in which the predominating mass has a density from about 4 to 14 lbs. per cubic foot and are relatively free of pinholes in the integral skin.

(3) Methods by which the level of aromatic diamines used in forming integral skin polyurethane foam structures can be reduced without adverse effects upon the integral skin.

(4) New methods of forming non-rigid polyurethane foam structures with integral skin.

(5) New compositions for the production of polyurethane foam structures comprising a combination of aryl diamine and polyhydroxy containing graft polymer of an ethylenic monomer on a polyol backbone polymer.

(6) Information on how to improve methods of forming non-rigid polyurethane foam structures to improve color characteristics, tear strength and elongation properties.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood that the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished in a major part by modifying the conventional compositions for the forming of polyurethane foam structures by including in such compositions a combination of an aryl diamine and a polyhydroxy containing graft polymer of an unsaturated monomer on a polyol backbone polymer.

The objects are further accomplished by the forming of a polyurethane foam structure with compositions containing the aforementioned combination of diamine and graft polymer by heating the composition to a controlled temperature prior to casting into a mold of from about 10 to 85° C. and casting the heated polymer mixture in a mold having a temperature adjusted to a predetermined value of from about 5 to 85° C.

In accordance with a preferred embodiment of the invention, formation of non-rigid polyurethane structures with an integral skin and characterized by a substantial lack of discoloration of the top coatings or finishes on exposure to ultraviolet light, good tear strength and good elongation comprises the following combination of steps:

(a) Providing a polyurethane polymer mixture containing:

(1) an organic polyisocyanate,
(2) an organic pneumatogen,
(3) a polyether polyol or polyester polyol having an average molecular weight between about 400 and 10,000.

(4) a polyurethane forming catalyst,
(5) a silicone block copolymer,
(6) at least one aryl diamine selected from the group consisting of (A)

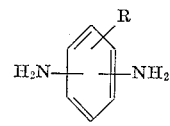

where R is halogen or methoxy, (B)

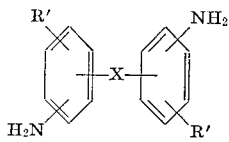

where X is $C_1$ to $C_{10}$ alkylene, oxygen,

or a bond joining the two aromatic rings and where R' is hydrogen, halogen (Br, Cl, F or I) or methoxy, at least one R' being halogen or methoxy, (C)

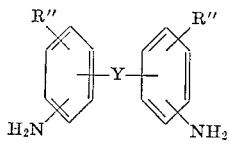

where Y is thio, polythio, seleno, polyseleno, telluro or polytelluro and where R'' is hydrogen, halogen (Br, Cl, F or I) or methoxy, and (D) a mixture of at least one aryl diamine of said group of A, B and C and up to 50 mol percent of said mixture of at least one aryl diamine selected from the group consisting of

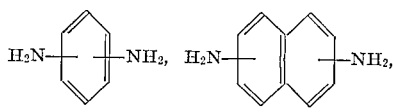

and

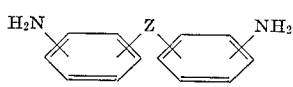

where Z is $C_1$ to $C_{10}$ alkylene, oxygen,

or the bond joining the two aromatic rings, (7) a polyhydroxy containing graft polymer of an ethylenic monomer on a polyol backbone polymer, said graft polymer having an average molecular weight of from about 400 to 15,000, (b) Heating said polymer mixture to a temperature of from about 10 to 85° C., (c) Casting the heated polymer mixture in a mold having a temperature adjusted to a predetermined value of from about 5 to 85° C., (d) Allowing the cast polymer mixture to foam in the mold, (e) Allowing the foam to remain at the ambient temperature of the foam for from about 5 to 30 minutes or heating the mold and contained foam for from about 3 to 15 minutes at a temperature of from about 100° to 135° C. after the foam in the mold has risen to full height, and (f) Removing the cured foam structure resulting from step (e) from the mold.

Using the improved methods of the invention it is possible to produce non-rigid polyurethane foam structures having an integral skin substantially free of pinholes, a tear strength of about 8 pounds per inch and an elongation of at least 200%. Such structures will comprise the reaction product of:

(a) an organic polyisocyanate,
(b) a polyhydroxy containing graft polymer of an ethylenic monomer on a polyol backbone, and
(c) an aryl diamine or mixture thereof as shown above.

Advantageously, the molds in which the polymer mixture is cast are made of metal and the mold is preheated before the polymer mixture is cast in the mold. Foam structures obtainable in this manner or in accordance with other preferred embodiments of the invention have an outermost integral skin, which can be thick or thin depending on whether a hot or cold mold was used, generally about 0.1 to 1.5 mm. of a density from about 40 to 60 lbs. per cubic foot, an intermediate thin layer adjacent the integral skin of up to about 2 mm. thick of a density of from about 20 to 40 lbs. per cubic foot, and a predominating mass of flexible or semiflexible foam of a density of from about 4 to 14 pounds per cubic foot.

Advantageously, one uses as the polyhydroxy containing graft polymer a reaction product of a vinyl monomer selected from the group consisting of acrylonitrile, methacrylonitrile and ethacrylonitrile with a polyoxyalkylene polyol having an average molecular weight of at least 400. Preferably, the foam producing composition also contains a fluorocarbon as the organic pneumatogen.

Of the various aryl diamines usable in the process, most advantageous results are obtained using alkylene-bis-chloroanilines.

DESCRIPTION OF PREFERRED EMBODIMENTS

The following details of operations in accordance with the invention and reported data illustrate further the principles and practice of the invention to those skilled in the art. In these numbered examples and throughout the remaining specification and claims, all parts and percentages are by weight unless otherwise specified.

The amount of the aryl diamine used is in part dependent upon its molecular weight and the quantity of polyols used in the foam producing mixture. In general, the proportion of such amine component plus total hydroxyl component to isocyanate component will be adjusted to give an —NCO to (—OH plus —NH$_2$) ratio of from about 0.85:1 to 1.2:1. Advantageously, a quantity of the aryl diamine is used so that from about 3 to 35 percent by weight of the polyurethane results from reaction of the isocyanate with the amine component and from about 65 to 97 percent by weight results from reaction of the isocyanate with the hydroxyl component.

A second essential component for use in the production of the new foam structures is a polyhydroxy containing graft polymer of an unsaturated monomer on a polyol backbone polymer. The graft copolymer appears to produce several unique results, viz, it helps in the formation of the integral skin and it eliminates the discoloration of surface coatings on the foam structures on exposure to ultraviolet light. There is also a cooperative effect between the aryl diamine and the graft polymer polyol. Thus, without the aryl diamine, the foam structure has poor tear strength and low elongation.

The graft polymer polyols which are usable in the invention are known. As the technology advances, it is probable that more equivalent materials will be developed that are also usable. Using the information as supplied herein, it will be possible for those skilled in the art to ascertain by a few preliminary tests the suitability of any material within the class as described for producing foam structures within the scope of the invention.

Examples of suitable graft polymer polyol compositions and their method of preparation are to be found in U.S. Pats. Nos. 3,294,711, 3,304,273 and 3,383,351, the disclosures of which are incorporated herein by reference. These graft polyol compositions may contain minor amounts of polyol homopolymer and of vinyl homopolymer or of vinyl copolymer if more than one vinyl monomer was used during the graft polymerization.

Acrylic type monomers are used in forming the best graft polymer polyols for use in the invention. A preferred group of monomers are acrylonitrile, methacrylonitrile and ethacrylonitrile. Another class preferred type of vinyl monomer are vinyl lactams, e.g., 1-vinyl-2-pyrrolidone (see U.S. 3,053,801).

The graft polymer polyols are products obtained by polymerizing or copolymerizing olefinically unsaturated monomers while dissolved in or while in contact with a polyol. A polyalkylene ether or a polyester containing a plurality of hydroxyl groups are examples of such polyols. The product obtained by polymerization of the vinyl monomers in contact with i.e., in situ in the polyol is in part a graft of the ethylenic monomer on the polyol backbone. It can contain some homopolymer of the ethylenic compound as well as some ungrafted polyol.

The molecular weight of the polyols depends in large measure on the end product desired. The optimum molecular weight is dependent on the number of active hydrogen containing groups, being larger when the number of such groups is increased as the lengths of the branched chains between such groups are shorter for a given molecular weight. For the non-rigid foams of the invention, the molecular weight of triols is usually above 400 and preferably between 600 and 7500. Higher molecular weights may be used, however. When the number of hydroxyl groups is more than three, then an increase in minimum molecular weight of the polyol above 500 is usually made to provide equivalent separation of hydroxyl groups.

The polyethers may be linear polymers such as polypropylene ether glycol or mixed condensates of propylene oxide and butylene oxide, allyl glycidyl ether and the like having only two hydroxyl groups, or they may be branched chain polyols having 2 to 6 hydroxyl groups such for example as the adducts of propylene oxide or other polymerizable monomeric oxide or mixture on a polyhydric alcohol, such as glycerine, trimethylol propane, triethanol amine, pentaerythritol, sorbitol, and the like, or with a compound such as ethylene diamine, or they may be mixed polyethylene-propylene oxide adducts on the polyhydric alcohols with 2 to 6 hydroxyl groups. Mixtures of polyols may also be used.

While polyethers are preferred for polymerization of vinyl monomers in contact therewith, some of the benefits of the present invention may be obtained when the polyol is a polyester such as the reaction product of adipic acid or sebacic acid with ethylene glycol, diethylene glycol, triethylene glycol, propylene glycol, butylene glycol and the like. Hydroxy oils such as castor oil and talloil may also be used. The polyester is preferably saturated but slightly unsaturated polyesters such as those prepared by a process wherein saturated acids such as adipic, phthalic and the like is substituted in minor part (less than 25%) by an unsaturated acid such as maleic or fumaric acids. Glycol component may also be unsaturated as for example monoallylether of trimethylol propane or 2-butendiol-1,4.

The polyethers used in the preparation of the mixed polymerization product with vinyl monomer or monomers may also be unsaturated if desired; as for example, the polyether prepared by condensing dihydroxy polybutadiene with ethylene or propylene glycol, the diols prepared by copolymerizing propylene oxide with an unsaturated olefine oxide such as butadiene monoxide, allyl glycidyl ether, or crotyl glycidyl ether, etc. The polyol may also be a dihydric alcohol such as dihydroxy polybutadiene of molecular weight of over 500. Mixtures of the above polyols may also be utilized. When unsaturated polyols are used, care must be taken not to cross-link the material to such a degree that it is not liquid at a suitable reacting temperature or is not soluble.

Any one or more of the above polyols may be utilized as a backbone for grafting thereon a polymer of a vinyl compound by polymerizing the vinyl compound or vinyl monomer in admixture with said polyol. The preferred vinyl compounds have an olefinic double bond thereof activated by having in conjugated relation therewith other double bonds such as are present in carbonyl groups, benzene nuclei or nitrile groups. Polymerizable vinyl compounds such as vinyl acetate which do not have conjugated double bonds but have ester or polar groups may also be used.

Examples of unsaturated monomers for grafting on polyols and/or for polymerizing in admixture with said polyols besides the preferred ones mentioned above are other acrylic type monomers, e.g., esters of acrylic and methacrylic acids such as methyl acrylate, ethyl acrylate, butyl acrylate, methyl methacrylate, ethyl methacrylate, n-hexyl methacrylate, glycol dimethacrylate and the like, vinyl esters, e.g., vinyl acetate and vinyl propionate; styrene, butadiene, alphamethyl styrene may be used as well.

In preparing the interpolymerization product of polymerizable monomer and polyol, the monomer is mixed with the polyol, for example, the polyalkylene ether, in the presence of a suitable initiator of polymerization, which may be a free radical producing catalyst such as peroxides or persalts such as hydrogen peroxide, sodium persulfate, potassium persulfate, potassium perborate, etc., organic peroxide such as benzoyl peroxide, dicumyl peroxide, ditertiary butyl peroxide, tertiary butyl hydroperoxide, tertiary butyl perbenzoate or the like. Other free radical forming catalysts such as a,a'-azobisisobutyronitrile are also suitable.

The well-known redox systems of polymerization such as those wherein a transition metal such as ferrous salts, a cobalt salt such as potassium cobaltinitrite, etc. may also be used in combination with the peroxide and/or a suitable reducing agent which may be an amine or even excess hydroxy groups on the polyols themselves may act as a reductant. Such systems include those wherein cuprous salts are used in conjunction with hydrazine hydrate, etc. Trivalent titanium salts in combination with amines, such as for example hydroxyl amines, are also excellent initiators of the polymerization of vinyl compounds such as acrylonitrile in presence of the polyols. Radiation techniques for initiation of polymerization are useful.

The graft polymer polyols may also be prepared by polymerizing under sufficiently anhydrous conditions, one or more of the olefinic (preferably monoolefinic) monomers in the presence of an ionic catalyst. In such systems the ionic catalyst, such as an alkali metal, for example, potassium, is reacted with polyalkylene glycol (including polyalkylene polyols generically) and the monomer then added to the system. The alkali metal apparently forms an alcoholate linkage with a few of the hydroxyl groups in the polyol.

The vinyl monomer is usually polymerized in the polyol with continued agitation or stirring. A solvent for both the polyol and the vinyl monomer may be present if desired but is not necessary. In some cases, it may be desirable in order to accelerate the polymerization to add a small amount of surfactant or a soap and some water so that polymerization occurs in emulsion form.

The vinyl monomer which is reacted in admixture with the polyol preferably has less than 10 aliphatic carbon atoms and preferably contains —CN or —CO— groups. When the percentage of monomer to polyol is about 5%, the improvement in the foam is substantially evident. As much as 50% of the grafted polyol may consist of polymerized unsaturated monomer units. Preferably, the graft polyol has an average molecular weight of from about 400 to 6500.

Example 1

An integral skin polyurethane foam structure with a density of the predominating mass of the foam of about 8½ lbs./ft.$^3$ was prepared using the following compositions:

PORTION A

| Ingredient: | Parts |
|---|---|
| Partially primary hydroxyl capped 3,000 M.W. polyoxypropylene triol | 100 |
| Block copolymer of dimethylene siloxane and alkylene oxide "L-540" | 0.002 |
| Triethylene diamine (1,4-diaza[2.2.2.]bicyclo octane) (.5 part solution of the diamine in 1 part dipropylene glycol, 33LV Dabco) | 0.5 |
| Dibutyl tin dilaurate "D22" | 0.2 |
| Methylene-bis-orthochloroaniline "MOCA" | 20 |

PORTION B

| Ingredient: | Parts |
|---|---|
| Prepolymer of a graft polymer polyol and an 80/20 mixture of 2,4 and 2,6 toluene diisocyanate isomers | 97.5 |
| Trichlorofluoromethane "Freon 11" | 18 |

The prepolymer was prepared by heating a mixture of 100 parts of the graft polymer polyol and 41 parts of the toluene diisocyanate mixture for 2 hours at 75–80° C. and then cooling to ambient temperature (20–22° C.). The graft polymer had previously been made by polymerizing acrylonitrile in contact with polyoxypropylene triol of 3,000 mol wt. to give a graft polymer containing 20% of acrylonitrile. (Niax polyol 3145, M.W., about 3600, OH number of about 45±1).

For use, Portion A was made by melting the "MOCA" and mixing it with the other ingredients. Portion B was made by mixing the prepolymer and fluorocarbon. Then Portions A and B were machine mixed and cast into a metal mold that had been preheated to 65° C. After the resulting foam had risen to full height (about 3 minutes), the mold was placed in an oven heated to 115° C. for 10 minutes to cure the foam. The mold and contents were then removed from the oven and before they had cooled below 90° C., the foam structure was removed from the mold.

The foam structure had an integral skin about 0.1 mm. in depth with a density about 50 lbs./ft.$^3$, an intermediate thin layer about 0.2 mm. in depth having a density of about 28 lbs./ft.$^3$, and a central predominating foam body of density about 8.5 lbs./ft.$^3$.

The foam structure was coated in one section with a polyurethane lacquer containing $TiO_2$ as a pigment and top coated with a clear (unpigmented) polyurethane lacquer. Another section of the foam structure was coated with a chlorosulfonated polyethylene paint containing TiO$_2$ as a pigment and then top coated with a clear vinyl chloride-vinyl acetate copolymer. When exposed to UV light for 100 hours in a "Fade-Ometer," no discoloration of the top coatings occurred.

A similar molded integral skin foam structure which did not contain the acrylonitrile graft polymer polyol exhibited marked discoloration of the top coatings on exposure to the UV light for 100 hours.

Example 2

This concerns formation of a molded integral skin foam structure using a so-called one-shot system.

The following foam-forming compositions were prepared:

PORTION A

| Ingredient—polymer: | Parts |
|---|---|
| Acrylonitrile (20%) graft on polypropylene (M.W. about 3000, partially ethylene oxide end capped) ether triol | 100 |
| "L-540" (see Example 1) | 0.002 |
| "33LV" (see Example 1) | 0.5 |
| "D22" (see Example 1) | 0.2 |
| "MOCA" (see Example 1) | 20 |

PORTION B

| Ingredient: | Parts |
|---|---|
| Tolylene diisocyanate | 20 |
| "Freon 11" (see Example 1) | 9 |

Portion A was heated to 30° C. and Portion B to 28° C. These portions were then machine mixed and immediately cast into a metal mold heated to 55° C. The cast mixture then was allowed to rise to full foam height (about 3 minutes) at which time the foam structure was cured and demolded as in Example 1. An integral skin foam structure, useful as an automobile arm rest, was obtained.

Example 3

This example illustrates the stability against discoloration of top finishes on aging and exposure to UV light of integral skin foam articles made in accordance with the invention.

A group of ten control foam articles were prepared by casting a foam forming mixture of the following ingredients into a mold:

PORTION A

| Ingredient: | Parts |
|---|---|
| Propylene oxide adduct of a triol partially capped with ethylene oxide of 6500 M.W. (commercially available as SF-6500) | 100 |
| "MOCA" (see Example 1) | 20 |
| "33LV" (see Example 1) | .5 |
| Stannous octoate | 0.2 |

PORTION B

| Ingredient: | Parts |
|---|---|
| Prepolymer A493 | 46.5 |
| Silicone block copolymer ("L540") | 0.2 |
| "Freon 11" | 20.0 |

Portions A and B at ambient temperature (25° C.) were homogeneously mixed and immediately cast into a metal mold heated to 40° C. The cast mixture was allowed to rise to full foam height at which time the foam structure was cured and demolded as in Example 1.

The prepolymer A493 was formed by mixing together 82 parts of tolylene diisocyanate and 100 parts of a polyol having a M.W. of 4500 which was a propylene oxide adduct of a triol partially capped with ethylene oxide during its manufacture.

There was obtained a molded foam article having an integral skin. This was covered with a thin coating of a top finish formed of the following ingredients:

| Ingredient: | Parts |
|---|---|
| Prepolymer F | 100 |
| Cellulose acetate butyrate with 1.5–2.5% OH groups | 10 |
| 1,4-butane diol (anhydrous) | 2 |
| Pigment—titanium dioxide | 10 |
| Solvent—methyl ethyl ketone 50%, toluene 10% and methyl isobutyl ketone 40% | 100 |

The prepolymer F was made to contain free —NCO groups by mixing in a 2:1 NCO/OH ratio hexamethylene diisocyanate and a hydroxyl terminated polyester of butylene-1,4-diol and adipic acid having a molecular weight of about 1000. Similar top finishes or coating that may be employed with effective results are described in U.S. Pats. Nos. 3,311,527 and 3,328,225.

A second group of ten integral skin foam articles of the same size and shape as the control group, but utilizing the improvements of the present invention were prepared by casting in the same metal mold under the same conditions the following mixtures:

PORTION A

| Ingredient: | Parts |
|---|---|
| "SF-6500" | 50 |
| Graft polymer A487 | 50 |
| "MOCA" | 20 |
| "33LV" | 1.5 |
| Stannous octoate | 0.2 |

PORTION B

Ingredients and parts same as in control.

The graft polymer A487 was prepared by polymerizing 15 parts of acrylonitrile in contact with 85 parts of "SF-6500" polyol and 0.5 part of benzoyl peroxide at 80° C. for 24 hours (see U.S. Pat. 3,294,711).

The second group of foam articles were coated with the same top finish in the same manner as the control group. Then, both groups were subjected to an accelerated aging test for 200 hours in a "Fade-Ometer." In all of the articles from the control group, the top finish coating was deeply darkened and exhibited a pronounced yellowing. In contrast, the articles of the second group showed no yellowing and only very slightly darkened. Accordingly, the second group of foam articles showed critically better aging properties and improved UV light stability of the top finish coating over the integral skin.

Example 4

A general formulation for a prepolymer system for preparing a polyurethane integral skin foam structure with integral skin according to the new methods is:

PORTION A

| Ingredient: | Parts |
|---|---|
| (a) Polyoxyalkylene polyol of mol. wt. 400–7500 at least 15% to fully primary hydroxyl capped | 70–95 |
| (b) Aryl diamine as herein defined, preferably halo- or methoxy substituted methylene-bis-aniline | 5–30 |
| (c) Dimethyl siloxane oils or block copolymers of dimethyl siloxanes and alkylene oxides | 0.001–2.0 |
| (d) Tertiary amine catalyst | 0.1–5.0 |
| (e) Metallic catalyst, e.g., dibutyl tin dilaurate, etc. | 0.0–2.0 |

PORTION B

| Ingredient: | Parts |
|---|---|
| (a) Urethane prepolymer of diisocyanates and vinyl grafted polyoxyalkylene polyol with mol wt. between 400–7500 containing 5 to 50% vinyl graft component. Percent —NCO of prepolymer 2.5–33% | (Note below) |
| (b) Organic pneumatogen, e.g., trichloro fluoromethane, etc. | 5–30 |

Note.—Portion B, Item (a), is used in an amount so that when Portions A and B are mixed, the mixture will have an —NCO to (—OH plus —$NH_2$) ratio of between 0.85 and 1.2 to 1.0.

The mixing and use of such formulations would be as described in Example 1.

Example 5

A general formulation for an integral skin semi-type prepolymer urethane foam system in accordance with the invention is:

PORTION A (a) Partially (15% minimum) or fully primary hydroxyl-capped, vinyl grafted polyoxyalkylene diols, triols, tetrols, etc., with a molecular weight between 400 and 7500 containing 5% to 50% of the vinyl polymer.
(b), (c), (d) and (e). Same as in Example 4.

PORTION B (a) and (b). Same as in Example 4.

Portions A and B should be mixed to give an NCO:(OH plus $NH_2$) ratio of between 0.85–1.2:1.0.

Preferred processing conditions for prepolymer systems:

(a) Preheat Portion A to 35° to 60° C.
(b) Hold Portion B to 24° and 30° C.
(c) Machine mix.
(d) Preheat mold to 35°–65° C.
(e) Curing conditions—3 minutes to 10 minutes in 115°–120° C. oven and demold hot.

Example 6

A general formulation for a one-shot integral skin polyurethane foam system in accordance with the invention is:

PORTION A (a) Partially (15% minimum) or fully primary hydroxyl-capped, vinyl grafted polyoxyalkylene diols, triols, tetrols, etc. with a molecular weight between 400 and 7500 containing 5% to 50% of the vinyl polymer.
(b), (c), (d) and (e). Same as in Example 4.

PORTION B (a) Diisocyanate-toluene diisocyanate (80/20 or 65/35 mixtures of the 2,4 and 2,6 isomers), or p,p'-diphenylmethane diisocyanate.
(b) Same as in Example 4.

Components A and B should be mixed to give an NCO:(OH+$NH_2$) ratio of between 0.85–1.2:1.0.

Preferred process conditions for one-shot system:

(a) Portion A—ambient temperature to 60° C.
(b) Portion B—hold between 24° and 30° C.
(c) Machine mix.
(d) Preheat mold to 35°–65° C.

In the one-shot process all of the foam forming ingredients are mixed together at one time. Two or more streams of compatible and mixed ingredients can be delivered to the mixing head of the foam machine to be mixed together at one time and then poured or dropped into the container or conveyor.

The polyurethane foams of the present invention can thus be made by the prepolymer process, the quasi- or semi-prepolymer process or the one-shot process.

The amount of the graft polymer polyol used in polyurethane formulations prepared according to the invention may be varied although superior results are attained using certain proportions. In regard to a maximum proportion, the graft polymer polyol may constittue the only —OH group component of the polyurethane formulation. In regard to a minimum proportion, sufficient should be used to inhibit UV discoloration of the coatings or finishes on the foam structure. Products having the best values in UV stability, tear strength and elongation are obtained when the graft polymer constitutes 30 to 70 percent of the total —OH component of the polyurethane formulation.

A third essential component of foam-forming mixtures of the invention is an organic polyisocyanate. The polyisocyanates are preferably diisocyanates but also tri- or poly-functional isocyanates can be used with the diisocyanates. Examples of polyisocyanates which may be used are: 1,4-butylene diisocyanate, hexamethylene diisocyanate, m-xylylene diisocyanate, p-xylylene diisocyanate, 2,4-dimethyl-1,3-xylylene diisocyanate, m-phenylene diisocyanate, p-phenylene-diisocyanate, 1-methyl phenylene-2,4-diisocyanate, 3-(a-isocyanate ethyl)-phenyl isocyanate, 1-methyl phenylene-2,6-diisocyanate, 2,6-diethyl phenylene-1,4-diisocyanate, diphenylmethane-4,4' - diisocyanate, diphenyl-dimethyl-methane-4,4'-diisocyanate or naphthylene-1,5-diisocyanate. Isocyanates with more than two spaced —NCO groups may also be used, such as for example the poly phenylene poly isocyanates. Additional polyisocyanates, useful in making polyurethane foams, are known in the art, e.g., see U.S. Pats. Nos. 3,036,996; 3,208,959 and 3,285,879. Mixtures of different diisocyanates are commonly used in preparing the foams.

An organic pneumatogen is used to create a desirable overall light density in the foam structure. Advantageously, the pneumatogen is a fluorocarbon or mixture thereof. Water is generally to be avoided, and only the water incidentally present as residual water in the polyols and amines, about up to 1% maximum, should be tolerated. Halogenated alkanes particularly the fluorinated alkanes having a boiling point below 80° C. give best results. Of such blowing agents trichloro-fluoromethane is usually preferred although other fluorinated alkanes having a boiling point between —50° C. and 110° C. or even higher, may be used if desired. The organic pneumatogen is used in an amount to give the required product density. For the preferred density and fluorocarbons, this component will amount to about 5 to 30 percent of the total foam-forming composition. Principles of the use of the fluorocarbons in the polyurethane foams are to be found disclosed in U.S. Pat. 3,072,582 which is incorporated herein by reference.

Any of the usual activators including a tertiary amine such as dimethyl benzyl amine, N-ethyl morpholine, per methylated diethylene triamine and/or organo metal-compounds are usually incorporated in order to accelerate the reaction (cf. U.S. 3,322,699). Also, these can be used as catalysts as well as tin compounds such as tin octoate, dibutyl tin dilaurate, and so forth. A small amount of conventional cell stabilizer such as for example as one of the silicone oils or any of the well-known stabilizers heretofore used for the commercial production of urethane foams are usable in the new methods. Silicone block copolymer oils known to the art for this use are preferred, e.g., silicone oil "L520," "L540," etc. Examples of other usable catalysts, activators and cell stabilizers, particularly silicone block copolymers, are given in U.S. Pats. Nos. 3,044,971; 3,060,137; 3,194,770 and 3,373,122, the disclosures of which are incorporated herein by reference. Such components are used in an amount required to perform their desired function as is known in the art, normally between about 0.001 to 2 percent of the total foamforming composition.

Suitable antidegradants for polyurethanes may be included in the formulation to protect against aging, particularly when exposed outdoors. See U.S. Pats. Nos. 2,915,496 and 3,208,959 on the use of alkyl substituted hydroxy aryl compounds, alkyl and aryl substituted phosphites, N,N'-dialkyl substituted phenylene diamines, and halogenated organic phosphites. Other known polyurethane antidegradants can be used. Some of this degradation such as the common yellowing of the polyurethane can be offset to some extent by the use of light stable diisocyanates or polyisocyanates which are known to the art. The aliphatic diisocyanates, durene diisocyanate, t-butyl tolylene diisocyanate and others can be used although some of them are expensive and hazardous.

Advantageously, the new foam structures will be made from formulations having —OH group containing ingredients other than the required graft polymer polyol. Polyesters can be used for this purpose, but polyethers are preferred. The polyesters are not as hydrolytically stable as the polyethers. Partially (15% minimum) or fully primary hydroxyl-capped polyoxyalkylene polyols, e.g., diols, triols, tetrols, etc., with a molecular weight between about 400 to 7500 are preferred. Examples of other polyols conventionally used in making polyurethane foams can be found in numerous publications, e.g., see U.S. Pats. Nos. 3,036,996 and 3,285,879. These polyols, as contrasted with the required graft polymers polyols, may constitute up to about 70 percent of the —OH group containing component of the foam-forming formulations.

In preparing the formulation thoroughly mixing of the ingredients is required to get complete (as much as theoretically possible) reaction. Incomplete mixing will result in some of the amines or impurities therein migrating to the surface and causing staining or discoloration. Good mixing alone without the graft polyol still gives discoloration. It is necessary to have a good mixing and to use graft polyol to avoid discoloration.

In the new operations, either cold (room temperature) or hot molds can be used depending also on the desired thickness of the skin. If one uses a low boiling fluorocarbon, it may be necessary to chill the mold. The mold acts as a heat sink to reduce the temperature of the foam adjacent the mold causing condensation of the fluorocarbon or preventing expansion of the fluorocarbon so the surface layers become dense and continuous. Metal molds (40–45° C.) are much preferred. Epoxy and polyethylene molds may be used but they may have to be cooled or chilled (32–35° C.). The mold temperature will depend on the formulation temperature and the thickness of skin desired, i.e., cold mold thick skin, hot mold thin skin. The foam produced has an outer skin which may be microporous, is flexible or semi-rigid, not rigid, and is open and/or closed cell.

The new integral skin foam structures may be used for many purposes without further processing. However, to provide increased abrasion resistance, create decorative effects or the like, it is frequently advantageous to apply outer coatings to the integral skin. Such outer coatings may be ordinary paints and lacquers, but special coatings are preferred. Any outer coating may be applied over the entire integral skin or only over part, e.g., in special function or decorative patterns. Heat reflective films or coatings, e.g., metallized coatings, light reflective coatings, e.g., reflective bead coatings or the like may be used.

The outer coatings which are pigmented for decorative purposes and which have been found to have the desired abrasion resistance, scratch resistance, adherence and so forth (for automobile arm rests) are of two general types: chlorosulfonated polyethylene (Hypalon) top coated with vinyl chloride-vinyl acetate copolymer and polyurethane. However, other top coatings or finishes such as the acrylics may be used. These coatings are, of course, usually pigmented and deposited from solution in a solvent.

A feature of the present invention is the discovery that these surface coatings do not discolor on exposure to UV light when the foam is made with a graft polyol especially where the grafting monomer is an unsaturated nitrile like acrylonitrile.

The chlorosulfonated polyethylene composition can be applied as one coat, or several coats can be applied to build up the desired thickness. This will depend on physical requirements and costs. Usually a second and final coat is applied, and it may contain a flatting agent. It is cured for about 20 minutes.

The polyurethane coating is made in two steps (see U.S. Pats. Nos. 3,311,527 and 3,328,225). A first coating is applied to the foam from a solvent comprising a prepolymer of hexamethylene diisocyanate (for light resistance) or tolylene diisocyanate and a 1000 M.W. butylene-1,4/adipic acid polyester diol containing free NCO groups (2:1 NCO/OH ratio), cellulose acetate butyrate (1½–2½% OH groups) and 1,4-butane diol. The composition has excess NCO after reaction of everything. Dibutyl tin dilaurate is used as a catalyst. The coating may be air dried or placed in an oven for 30 minutes at 90–95° C. A second or outer coating is then applied to the first comprising a NCO terminated prepolymer of hexamethylene diisocyanate or tolylene diisocyanate and a 2000 M.W. polyethylene-propylene (1,2) adipate diol or a polyethylene-butylene (1,4) adipate diol. Cellulose acetate butyrate is added in an amount to give excess OH groups. Dibutyl tin dilaurate is the catalyst. The second coating may be air or oven dried or cured like the first.

The foams as described herein are useful in making seats for bicycles, motorcycles, tractors, etc.; seats and arm rests for automobiles, furniture, etc.; crash pads; head rests for automobiles; windshield moldings; weatherstripping; automobile bumpers and exterior protective strips. Also, the wood in some furniture is being replaced with rigid polyurethanes, e.g., see "Rubber Plastics Age," 49 (2): 140, February 1968. With the present invention, it is possible, after making the rigid frame, to cast the semi-rigid or flexible arm rest and flexible seats and backs against the frame to make an integral piece of polyurethane furniture.

DISCUSSION OF DETAILS

One of the essential components of the new methods and products is an aryl diamine of the type as hereinbefore defined. Within this class of materials from which either single compounds may be used in carrying out the invention or mixtures of two or more such compounds, a preferred group of the diamines are those having the following formula:

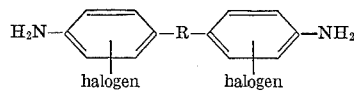

wherein R is a 1 to 3 carbon atom alkylene radical, e.g., methylene, ethylene, etc. Compounds in which R is methylene are especially useful.

Another group of very useful diamines are those having the following formula:

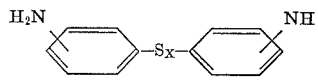

wherein X is an integer, e.g., 1, 2, etc.

Specific examples of aryl diamines for use in the invention are:

methylene-bis-orthochloroaniline
3,3'-dichlorobenzidine
3,3'-dimethoxybenzidine
3-amino-4-chloroaniline
bis(4-amino-3-chlorophenyl)oxide
bis(4-amino-2-chlorophenyl)propane
bis(4-amino-2-chlorophenyl)sulfone
bis(4-amino-3-methoxyphenyl)decane
3-methoxy-4-aminoaniline
bis(4-aminophenyl)sulfide bis(4-aminophenyl)telluride
bis(4-aminophenyl)selenide
4-bromo-1,3-phenylenediamine
bis(4-amino-3-methoxyphenyl)disulfide
4,4'-methylene bis (2-iodoaniline)
4,4'-methylene bis (2-bromoaniline)
4,4'-methylene bis (2-fluoroaniline)
4-aminophenyl-2-chloroaniline Additional examples of specific compounds with the formulae hereinbefore stated that may be used can be found in U.S. Pat. No. 3,036,996, the disclosure of which is incorporated herein by reference. Further examples of diamines usable in polyurethane foam products are found in U.S. Pats. Nos. 3,261,813; 3,285,879 and 3,316,220.

With the sulfur, selenium and tellurium containing diamines it is not necessary that they be substituted with halogen or methoxy groups. However, in the case of hydrocarbon diamines or those containing oxygen,

or alkylene linkages, halogen or methoxy groups must be present to act as inhibitor groups or otherwise the diamines are too reactive to produce the desired skin forming operation. One inhibiting atom or group is sufficient in the bicyclic amines, but the preferred bicyclic amines contain two inhibiting atoms or groups.

Materials of this type are commercially available in technical grade or impure forms which may be satisfactorily used, e.g., "LD–813." Such commercial materials may contain triamines or other ingredients of functionality greater than two. However, such materials are not as advantageous as those which has a functionality of 2.0, since the higher functionality materials tend to reduce tear resistance of the resulting foam structures.

Examples of non-substituted aryl diamines, or mixtures thereof, which can be mixed in an amount up to 50 mol percent with the amines, or mixtures thereof, i.e., "A," "B" and/or "C" above, are meta-phenylene diamine, para-phenylene diamine, naphthalene diamine, benzidine, bis-(4-amino-phenyl)methane, 4,4'-diaminobibenzyl, di(para-amino-phenyl)ether, 3,3'-diamino diphenyl sulfone, 4,4'-diaminodiphenyl sulfone and the like.

The embodiments of the invention in which an exclusive property or privilege is claimed are defined as follows:

1. A polyurethane foam structure with an integral skin, which structure is characterized by (1) the property that organic polymeric coatings deposited from solution in a solvent on said integral skin do not substantially discolor on exposure to ultraviolet light, (2) a density of from about 4 to 14 lbs./ft.$^3$ for the predominating mass of the foam, (3) a tear strength of at least 8 lbs./in., and (4) an elongation of at least 200%, said structure comprising the reaction product in the presence of an organic blowing agent, of a mixture comprising:
(a) an organic polyisocyanate,
(b) a polyol having an average molecular weight from about 400 to 15,000 prepared by polymerizing an ethylenically unsaturated monomer in situ in an organic polyol, said monomer being substantially free of hydrogen groups reactive with —NCO groups, and
(c) at least one aryl diamine selected from the group consisting of:
(A)

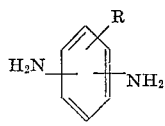

where R is halogen or methoxy, (B)

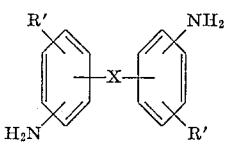

where X is $C_1$ to $C_{10}$ alkylene, oxygen,

or a bond joining the two aromatic rings and where R' is hydrogen, halogen or methoxy, at least one R' being halogen or methoxy,
(C)

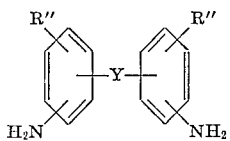

where Y is thio, polythio, seleno, polyseleno, telluro or polytelluro and where R" is hydrogen, halogen or methoxy, and
(D) a mixture of at least one aryl diamine of said group of A, B and C and up to 50 mol percent of said mixture of at least one aryl diamine selected from the group consisting of

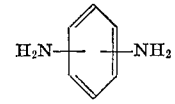

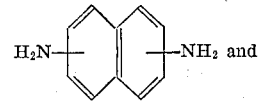
and

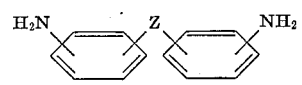

where Z is $C_1$ to $C_{10}$ alkylene, oxygen,

or the bond joining the two aromatic rings.

2. A foam structure of claim 1 wherein said polyol is a primary hydroxyl-capped polyoxyalkylene polyol having an average molecular weight between 400 and 10,000.

3. A foam structure of claim 1 wherein said polyol is the polymerization product of a vinyl monomer selected from the group consisting of acrylonitrile, methacrylonitrile and ethacrylonitrile with a polyoxyalkylene polyol having an average molecular weight of at least 400.

4. A foam structure of claim 1 wherein said diamine is an alkylene-bis-chloroaniline.

5. A foam structure of claim 1 wherein the outermost portion of said integral skin has a density from about 40 to 60 lbs./cu. ft.

6. A foam structure of claim 1 wherein said polyol is the product obtained by polymerizing acrylonitrile in situ in a polyoxyalkylene ether triol.

7. A foam structure of claim 1 that is the reaction product of said mixture additionally comprising a tertiary amine activator.

8. A foam structure of claim 1 that is the reaction product of said mixture additionally comprising polyol other than said polyol (b) in an amount up to about 70% by weight of the polyol components.

References Cited

UNITED STATES PATENTS

| | | |
|---|---|---|
| 1,991,646 | 2/1935 | Wuertz et al. |
| 2,091,573 | 8/1937 | Theobald. |
| 2,258,806 | 10/1941 | Pier et al. |
| 2,398,414 | 4/1946 | Denison et al. |
| 2,402,686 | 6/1946 | Signaigo. |
| 2,427,776 | 9/1947 | Diamond. |
| 3,178,490 | 4/1965 | Petrino et al. 264—41 |
| 3,182,104 | 5/1965 | Cwik 264—45 |
| 3,294,711 | 12/1966 | Bonin 260—2.5 |
| 3,304,273 | 2/1967 | Stamberger 260—2.5 |
| 3,304,278 | 2/1967 | Hauptschein et al. 260—29.6 |
| 3,383,351 | 5/1968 | Stamberger 260—33.2 |
| 3,405,162 | 10/1968 | Kuryla 260—465.6 |
| 3,473,951 | 10/1969 | De Rossi et al. 117—72 |

FOREIGN PATENTS

| | | |
|---|---|---|
| 735,010 | 5/1966 | Canada 260—2.5 |
| 1,040,452 | 8/1966 | Great Britain 260—2.5 |
| 1,084,657 | 9/1967 | Great Britain 260—77.5 |
| 1,448,751 | 7/1966 | France 260—2.5 |

OTHER REFERENCES

Niax Polyol 31–45, Bulletin of Union Carbide Corporation, Chemicals Division, Bulletin No. F–41322 (4 pages), published in January of 1966.

Chemical Abstracts, 30, 6895.

Chemical Abstracts, 49, 10876.

Journal American Chemical Society, 61, 2306–2307 (1939).

DONALD E. CZAJA, Primary Examiner

H. S. COCKERAM, Assistant Examiner

U.S. Cl. X.R.

117—138.8D; 260—2.5AP, 2.5BB, 13, 18TN, 32.8N, 33.6UB, 77.5CR